Nov. 18, 1969          T. J. O'CONNOR          3,479,479
QUICK-CHANGE TOOL FOR SPARK CUTTING APPARATUS
Filed June 20, 1966          6 Sheets-Sheet 1
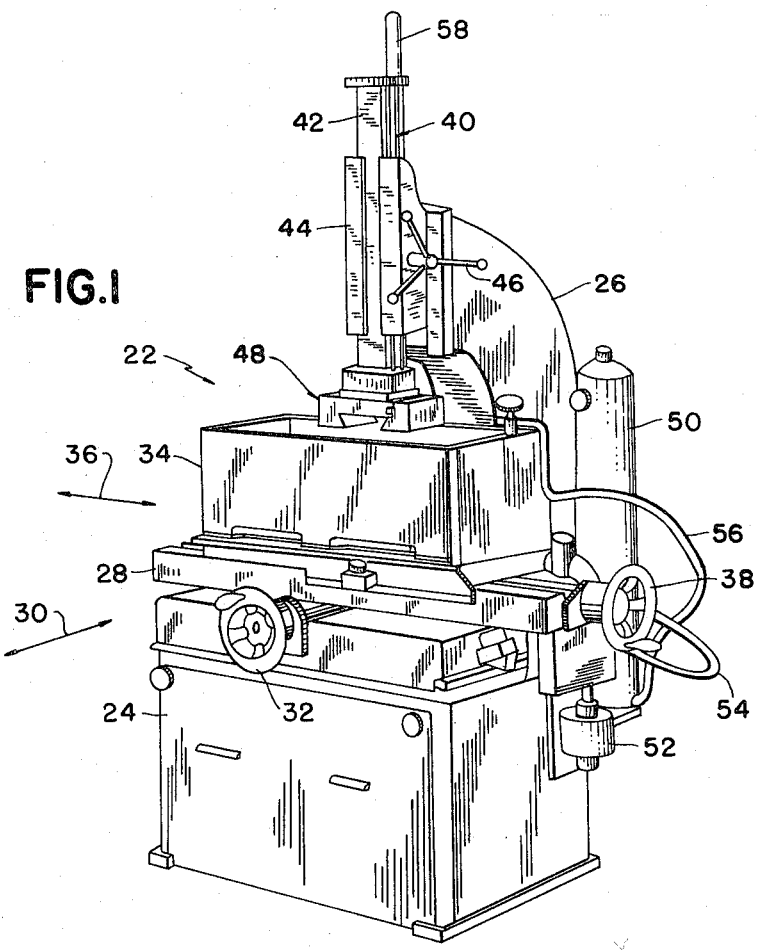
INVENTOR.
THOMAS J. O'CONNOR
BY Whittemore, Hulbert & Belknap
ATTORNEYS Nov. 18, 1969   T. J. O'CONNOR   3,479,479
QUICK-CHANGE TOOL FOR SPARK CUTTING APPARATUS
Filed June 20, 1966   6 Sheets-Sheet 2
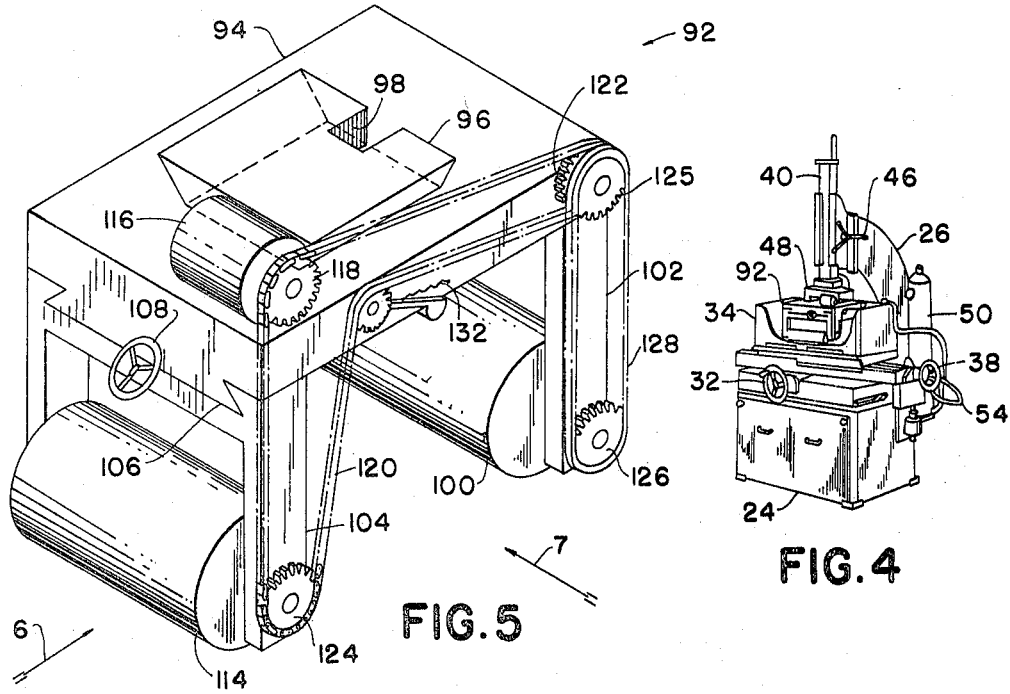
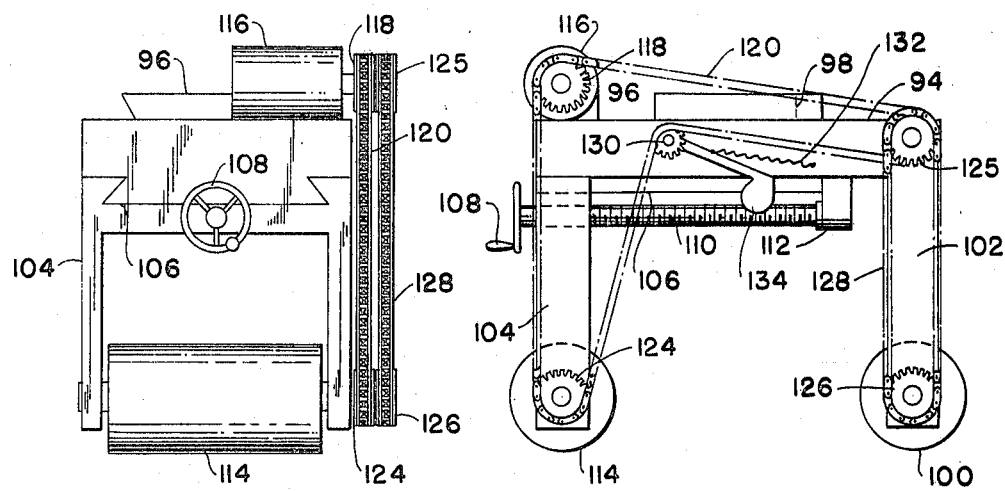
INVENTOR.
THOMAS J. O'CONNOR
BY *Whittemore, Hulbert*
*& Belknap*
ATTORNEYS Nov. 18, 1969  T. J. O'CONNOR  3,479,479
QUICK-CHANGE TOOL FOR SPARK CUTTING APPARATUS
Filed June 20, 1966  6 Sheets-Sheet 3
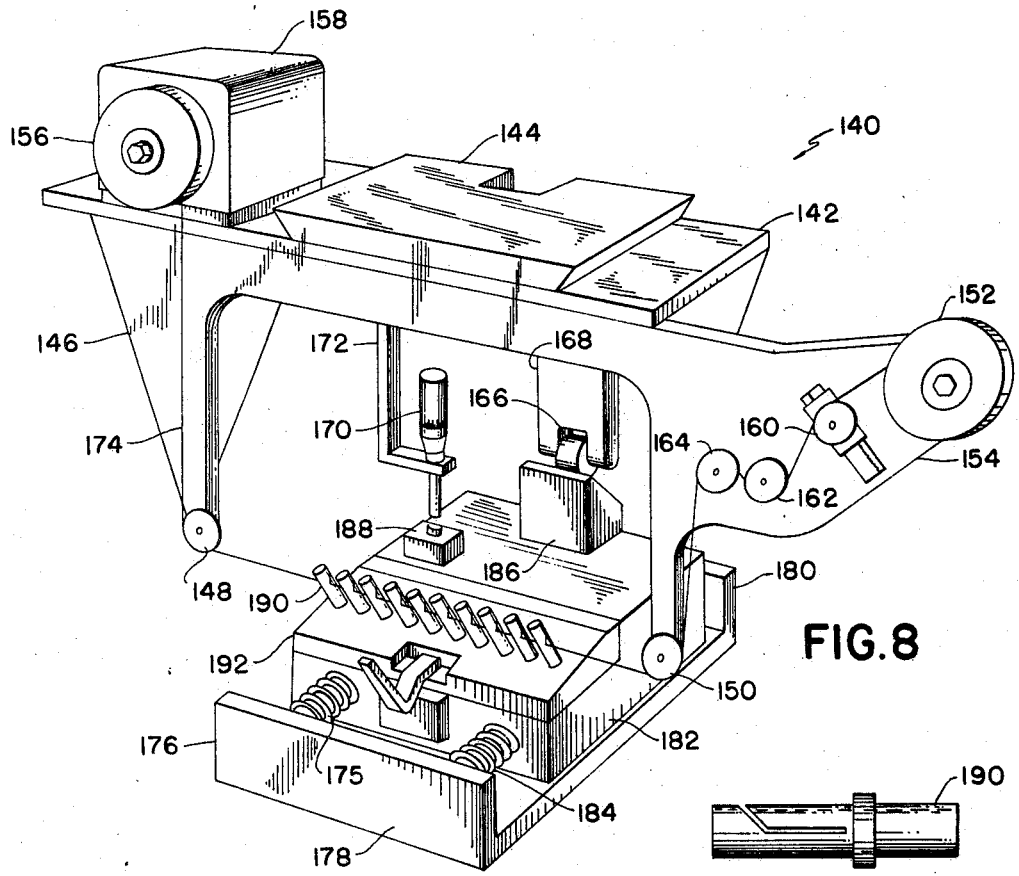
FIG. 8
FIG. 9
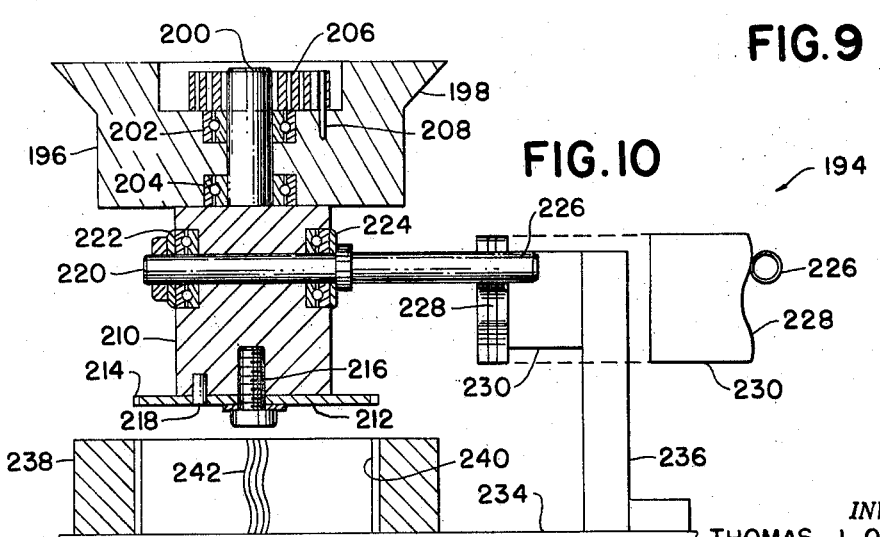
FIG. 10
INVENTOR.
THOMAS J. O'CONNOR
BY Whittemore, Hulbert
& Belknap
ATTORNEYS Nov. 18, 1969  T. J. O'CONNOR  3,479,479

QUICK-CHANGE TOOL FOR SPARK CUTTING APPARATUS

Filed June 20, 1966  6 Sheets-Sheet 4

INVENTOR.
THOMAS J. O'CONNOR
BY *Whittemore, Hulbert*
*& Belknap*
ATTORNEYS

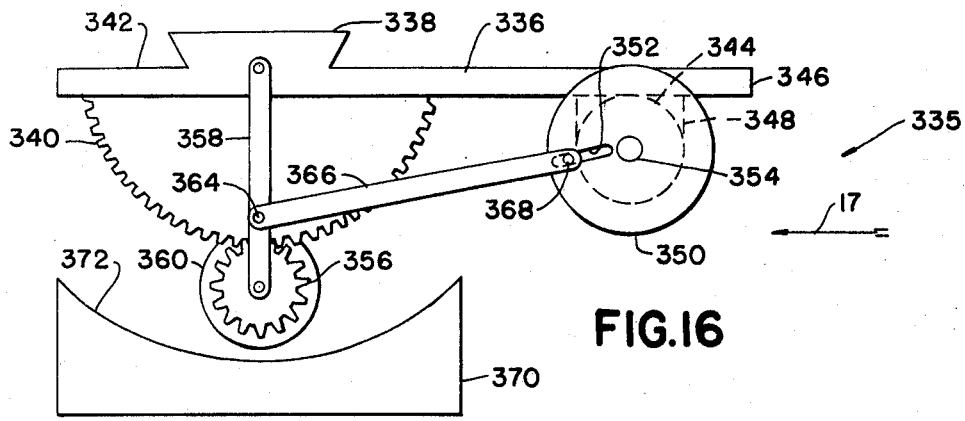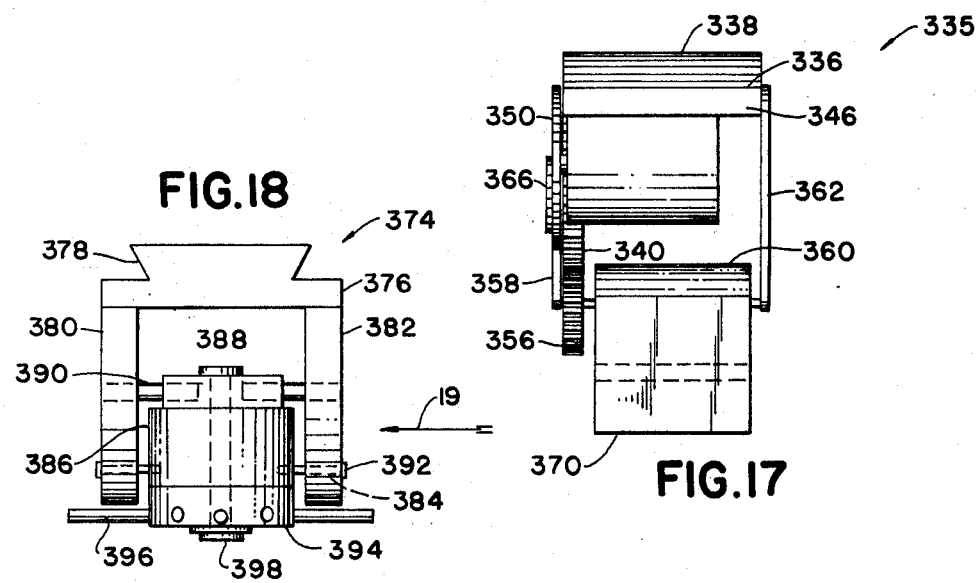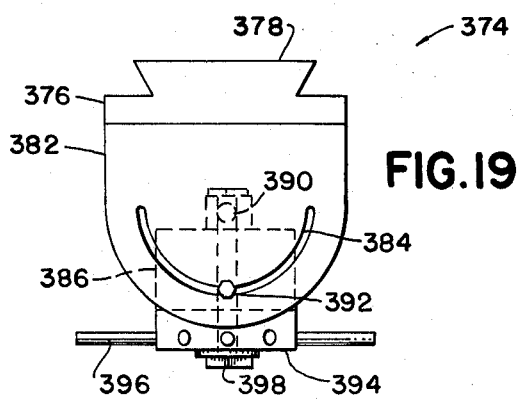

Nov. 18, 1969   T. J. O'CONNOR   3,479,479

QUICK-CHANGE TOOL FOR SPARK CUTTING APPARATUS

Filed June 20, 1966   6 Sheets-Sheet 6

INVENTOR.
THOMAS J. O'CONNOR
BY Whittemore, Hulbert
& Belknap

ATTORNEYS

United States Patent Office 3,479,479
Patented Nov. 18, 1969

3,479,479
QUICK-CHANGE TOOL FOR SPARK
CUTTING APPARATUS
Thomas J. O'Connor, 100 Morgan Road,
Ann Arbor, Mich. 48104
Continuation-in-part of application Ser. No. 504,971,
Oct. 24, 1965. This application June 20, 1966, Ser.
No. 558,695
Int. Cl. B23k 9/16; B23p 1/00; B24b 7/00
U.S. Cl. 219—69                                    4 Claims

ABSTRACT OF THE DISCLOSURE

A plurality of separate electrode carrying tools adapted to be quickly and accurately secured by dovetail connection to the chuck are disclosed, including means for moving at least one of two parallel electrodes toward each other and for simultaneously rotating the electrodes, moving wire means for cutting thin slots having a predetermined contour, cam means for rotating an axially moving electrode, means for moving electrodes toward opposite sides of a workpiece simultaneously on movement of the ram toward the workpiece, means for providing rotation of the electrodes as they are simultaneously moved toward opposite sides of a workpiece on movement of the ram toward the workpiece, means for machining a large arc with a rotating electrode having a smaller arc, means for universally positioning a plurality of separate electrodes, a plurality of thread or spline cutting structures, and tracing structure.

---

This application is a continuation-in-part of application Ser. No. 504,971, filed Oct. 24, 1965, now Patent No. 3,363,083, which in turn is a continuation-in-part of application, Ser. No. 250,321, filed Jan. 9, 1963, now Patent No. 3,222,494.

The invention relates to electrical machining of metals and refers more specifically to a machine tool and a quick-change system of tools for electrical discharge machining.

In electrical discharge machining of conductive materials, it is the usual procedure to support an electrode on an electrode carrying head for movement toward and away from a workpiece to be machined. These electrodes must be periodically changed either due to wear of the electrode or the operation performed. In the past, changing the electrodes or tools carrying the electrodes has been a tedious and time consuming operation since each electrode has had to be separately positioned relative to the head and workpiece on each changing thereof.

One object of the invention is to provide a system of quick-change tools for electrical discharge machining structure.

Another object is to provide a quick-change tool for use in conjunction with electrical discharge machining structure as set forth above or the like including means for rotatably supporting a pair of electrodes in parallel spaced apart relation for selectively moving the electrodes toward each other and toward a workpiece to machine both sides of a workpiece simultaneously while rotating the electrodes.

Another object is to provide a quick-change tool for use in conjunction with electrical discharge machining structure as set forth above comprising a moving wire device and means for cutting a slot having a predetermined contour with the moving wire device.

Another object is to provide a quick-change tool for use in conjunction with electrical discharge machining structure as set forth above or the like comprising means for cutting internal axially extending grooves in a cylindrical member having a variable axial contour.

Another object is to provide a quick-change tool for use in conjunction with electrical discharge machining structure as set forth above or the like including means for transversely feeding a pair of electrodes toward each other to cut both sides of a workpiece placed therebetween simultaneously.

Another object is to provide a quick-change tool for use in conjunction with electrical discharge machining structure as set forth above or the like including means for rotating the pair of electrodes as they are advanced toward the workpiece.

Another object is to provide a quick-change tool for use in conjunction with electrical discharge machining structure as set forth above or the like including means for machining a large arcuate area of a selected contour with an arcuately reciprocating, rotating electrode.

Another object is to provide a quick-change tool for use in conjunction with electrical discharge machining structure as set forth above or the like including means for angularly indexing a plurality of electrodes in one plane and pivoting the plane through at least ninety degrees.

Another object is to provide a quick-change tool for use in conjunction with electrical discharge machining structure as set forth above or the like including structure for producing threads on a cylindrical workpiece.

Another object is to provide a quick-change tool for use in conjunction with electrical discharge machining structure as set forth above or the like including structure for producing interval or external splines or the like on a cylindrical workpiece.

Another object is to provide a quick-change tool for use in conjunction with electrical discharge machining structure as set forth above or the like including structure for exactly copying in a workpiece the profile of a master pattern.

Another object is to provide a quick-change system of tools for electrical discharge machining which is simple in construction, economical to manufacture and efficient to use.

Other objects and features of the invention will become apparent as the description proceeds, especially when taken in conjunction with the accompanying drawings, illustrating a preferred embodiment of the invention wherein:

FIGURE 1 is a perspective view of a machine tool structure for use in electrical discharge machining of metal or the like constructed in accordance with the invention.

FIGURE 2 is an enlarged diagrammatic representation of the quick-change chuck structure of the machine tool illustrated in FIGURE 1 showing the dovetail tool receiving a recess for receiving the quick-change tools of the invention.

FIGURE 3 is an end view of the chuck structure illustrated in FIGURE 2 taken in the direction of line 3—3 in FIGURE 2.

FIGURE 4 is a perspective view of the machine tool illustrated in FIGURE 1 having a quick-change tool as shown in FIGURES 5, 6 and 7 secured thereto.

FIGURE 5 is a perspective view of a quick-change tool for use in conjunction with the machine tool illustrated in FIGURES 1-4 for machining both sides of a workpiece with a separate rotary electrode simultaneously.

FIGURE 6 is an elevation view of the tool illustrated in FIGURE 5 taken in the direction of arrow 6 in FIGURE 5.

FIGURE 7 is an elevation view of the tool illustrated in FIGURE 5 taken in the direction of arrow 7 in FIGURE 5.

FIGURE 8 is a perspective view of a quick-change tool for use in conjunction with the machine tool illustrated in FIGURES 1–4 for cutting slots having a varied contour.

FIGURE 9 is an enlarged elevation view of a workpiece produced by the tool illustrated in FIGURE 8.

FIGURE 10 is an elevation view, partly in section of a quick-change tool for use in conjunction with the machine tool illustrated in FIGURES 1–4 for producing axial grooves in a cylindrical workpiece having a varied contour.

FIGURE 16 is an elevation view of a quick-change tool for use in conjunction with the machine tool illustrated in FIGURES 1–4 for machining a large arcuate surface with a rotating electrode.

FIGURE 17 is an end view of the tool illustrated in FIGURE 16 taken in the direction of arrow 17 in FIGURE 16.

FIGURE 18 is an elevation view of a quick-change tool for use in conjunction with the machine tool illustrated in FIGURES 1–4 for substantially universal positioning of a plurality of electrodes.

FIGURE 19 is a side view of the tool illustrated in FIGURE 18 taken in the direction of arrow 19 in FIGURE 18.

Figure 11:
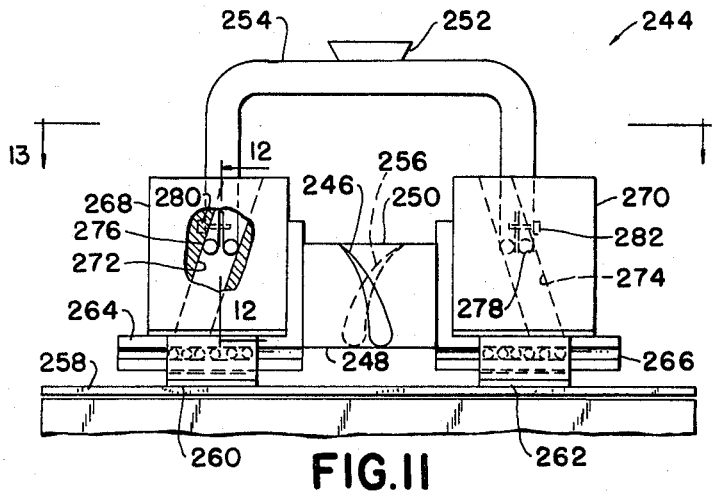
FIGURE 11 is a partly broken away elevation view of a quick-change tool for use in conjunction with the machine tool illustrated in FIGURES 1–4 for feeding electrodes toward a workpiece from both sides thereof simultaneously.

With particular reference to the figures of the drawings, one embodiment of the present invention will now be disclosed in detail.

The machine tool structure 22 for electrical discharge machining illustrated best in FIGURE 1 includes the base 24 on which the frame 26 is supported. A table 28 is supported on the base for movement in the direction of arrow 30 on rotation of the handle 30 by means of, for example, a screw and a nut arrangement. The table 28 supports the tank 34 which is movable in the direction of arrow 36 on rotation of the wheel 38. The tank 34 is thus movable in substantially any direction in a horizontal plane.

Head structure 40 is secured to the frame 26 and includes the ram 42 supported for vertical movement in the guides 44 on rotation of the actuating lever 46 as by means of a rack and pinion or the like. Chuck structure 48 is secured to the lower end of the ram 42 and is shown better in FIGURES 2 and 3.

A dielectric fluid is pumped between the tank 34 and a storage tank therefor (not shown) and positioned in the base 24 by means of the motor 52 and the hydraulic lines 54 and 56. The dielectric fluid from tank 34 is filtered through filter 50 before it is returned to tank 35 after use.

In operation of the machine tool structure 22 a workpiece is positioned in the tank 34 and an electrode holding quick-change tool is secured to the ram 42 by means of the chuck structure 48 and the electrode is connected to one terminal of an electrical discharge machining power supply (not shown), while a conducting workpiece is conected to the other terminal thereof. The tank 34 is filled with dielectric fluid from the storage tank in the base 24 of the machine tool 22 and the electrode is moved toward the workpiece by a gap maintaining servomechanism in conjunction with the hydraulic motor 58 for automatically positioning the ram 42. The workpiece is thus formed in accordance with the usual principles of electrical discharge machining as for example set forth in the British publication, The Electro Erosion Machining of Metals by A. L. Livshits, published by Butterworth & Company, Publishers, London, England, 1960. Since such operation is well known, it will not be considered in detail herein.

More specifically the chuck structure 48, as shown better in FIGURES 2 and 3, includes the member 60 having a recess 62 therein for receiving the lower end 64 of the ram 42, a transverse bore 66 therein for receiving the bolt 68 and a recess 70 therein forming one-half of a dovetailed slot 72 of the chuck structure 48. The member 60 further includes a slot 74 in one side thereof for receiving the tongue 76 of the chuck member 78.

A dielectric sheet 80 insulates the chuck structure 48 from the ram 64 to which it is connected.

A locking pin or stud 82 is provided in recess 72 and cooperates with a recess 84 shown in phantom in FIGURE 3 of a dovetail portion of the quick-change tools illustrated in FIGURES 4–20 for exactly locating the tools in the direction of arrow 86 in FIGURE 3.

Thus in operation, when it is desired to secure one of the dovetail tools illustrated in FIGURES 4–20 to the machine tool structure 22 illustrated in FIGURE 1, the bolt 68 is loosened as by turning the handle 88 in the appropriate direction whereby the member 78 of the chuck structure 48 may be moved so that the dovetail slot formed between the members 60 and 78 wider than necessary to receive the dovetail portion of one of the tools of FIGURES 4–20. The dovetail portion of one of the tools having a locating recess 84 therein is then positioned in the dovetail slot 72 with the pin 82 resting against surface 83 of the recess 84. The bolt 68 is then tightened to seat the dovetail portion of the tool against the side 73 of the dovetail slot 72. The tool is thus located with respect to the ram 42 in the direction of arrow 90 in FIGURE 2.

Thus it will be seen that any one of the quick-change tools illustrated in FIGURES 4–20 may be interchanged on the machine tool structure illustrated in FIGURE 1 and will be in an exactly predetermined location with respect thereto due to the locating pin 74 and dovetail slot 72 provided by the chuck structure 48. Since a workpiece in the tank 34 need not be moved while changing tools, electrodes carried by the tools interchanged will also be in a predetermined position with respect to the workpiece. The tedious process of aligning each tool on the machine tool and with respect to a workpiece each time a tool is changed is thus eliminated.

The quick-change tool 92 illustrated in FIGURES 4–7 includes a base 94 adapted to be secured to the machine tool structure 22 by means of the dovetail portion 96 having a locating recess 98 therein cooperable with the locating pin 82 of the chuck structure 48. A cylindrical electrode 100 is mounted for rotation on the members 102 depending from the base 94 on each side thereof. Yoke structure 104 is slidable longitudinally of the base member 94 on the dovetail slide 106 provided on the base 94 on rotation of the handle 108 illustrated in FIGURE 7 due to the screw 110 secured to the yoke 104 and rotatable with respect thereto engaged in the nut 112 secured to the base 94. The yoke 104 supports the cylindrical electrode 114 for rotation parallel to the cylindrical electrode 100.

Motor 116 drives pinion 118 whereby the endless linear chain 120 drives the pinions 122 and 124 carried by the base 94 and the yoke 104 respectively. Driving of pinion 122 causes pinion 125 which is also rotatably secured to the base 94, to rotate and drive pinion 126 through the chain 128. Pinion 130 is biased into engagement with the chain 120 by resilient means 132 about the pivot means 134 therefor to maintain the chain 120 in a driving relation with pinions 122 and 124 as the yoke 104 is moved toward the fixed members 102.

Thus, in operation of the quick-change tool 92, electrodes 100 and 114 are secured to the members 102 and the yoke 104 for rotation on rotation of the pinions 124 and 126. The desired distance between the electrodes 100 and 114 is decided upon and the yoke 104 is moved toward the member 102 by means of the screw and nut 110 and 112. The tool 92 is then secured to the machine tool structure 22, as illustrated in FIGURE 4, by means of the chucking structure 48 and after an electrical discharge machining power supply (not shown) is connected to the electrodes 100 and 114 and a conductive workpiece in the tank 34, the ram 42 is moved downward by the usual servomechanism, whereby both sides of a workpiece may be machined electrically simultaneously with the electrodes 100 and 114 rotated by energizing the motor 116.

While the plain cylindrical electrodes 100 and 114 have been shown it will be understood that the electrodes 100 and 114 may have any desired surface contour required by the workpiece to be machined. In addition, it will be understood that the fixed members 102 may be moveable toward and away from the yoke 104 by additional screw and nut means, if desired, and other similarly rotating and movable electrodes may be provided extending at right angles to the electrodes 100 and 114.

The moving wire quick-change tool 140 illustrated in FIGURE 8 again includes a base 142 adapted to be secured in a chuck structure 48 by means of a dovetail portion 144. Yoke 146 depends from the base 142 and supports the wire guides 148 and 150 at the lower extremities thereof. A wire reel 152 is positioned at end 154 of yoke 146, while wire reel 156 is supported on the base 142 by motor 158. Tensioning and straightening means in the form of pulleys 160, 162 and 164 are secured to the yoke 146. Cam wheel 166 is supported from base 142 by member 168, while the gage 170 is supported from the base 142 by member 172. The electrode wire 174 is passed over the tensioning and straightening pulleys 160, 162 and 164 from wire reel 152 and over the positioning pulleys 150 and 148 to the take-up reel 156. Thus, in operation with the motor 158 energized a continuous wire electrode will be passed between the pulleys 148 and 150.

The tool 140 further includes the work holding fixture base 176 which is generally U-shaped as shown in FIGURE 8, and which may be secured in a fixed position beneath the ram 42 of the machine tool 22 to which the base 142 is attached in predetermined relation with respect thereto. A pair of rods 175 extend between and are supported by the upstanding portions 178 and 180 of the base 176. Slide 182 is carried on the rods 175 and is biased against the end 180 of the base 176 by spring means 184 operable between the slide 182 and the end 178 of base 176.

The gage block 188 is mounted on the slide 182 for cooperation with the gage 170 carried by the bracket 172 depending from the yoke 174. Workpieces 190, best shown in FIGURE 9, are mounted in a fixture 192 carried on slide 182, as shown best in FIGURE 8.

In operation of the tool 140, the wire electrode 146 is positioned, as indicated in FIGURE 8, and the motor 158 is started to wind the electrode from the reel 152 onto the reel 156. The base 142 is secured to the ram of the machine tool 22, and the ram is moved downward.

The wire electrode 174 machines a slot in the workpieces 190, as shown in FIGURE 8, which is vertical until the cam roller 166 engages the cam block 186, at which time the slide is moved with movement of the ram a distance dependent upon the angle of the cam surface on the cam block 186 in opposition to the spring means 184. The direction of the slot in the workpieces 190 machined by the wire electrode 174 is thus changed and may be axial of the workpieces 190, as shown in FIGURE 9. Reverse movement of the slide 182 is provided under urging of the spring means 184 on upward movement of the cam wheel 166 when a desired slot has been machined. A slot having substantially any contour machined on cam block 186 may thus be produced in the workpieces 190.

The tool 194 may be used in conjunction with the machine tool 22 to produce axial grooves having substantially any contour in a cylindrical member and includes a base 196 which again may be secured to the ram of the machine tool 22 by means of a dovetail portion 198 thereon. Shaft 200 is mounted in the base 196 for rotation by means of bearings 202 and 204. The shaft 200 is urged in one rotational direction about the longitudinal axis thereof by the spiral spring 206 which is fixed to the base 196 at one end by the pin 208 and is secured at the other end to the shaft 200. An electrode mounting block 210 depends from the shaft 200 and is rotatable therewith. Electrode 212 having the groove cutting projections 214 on the periphery thereof is secured to the mounting block 210 by convenient means, such as the bolt 216 and pin 218.

A shaft 220 extends transversely of the shaft 200 and is rotatably mounted in the mounting block 210 by means of the bearings 222 and 224. The end 226 of shaft 220 is thus held in resilient engagement with the cam surface 228 of the cam 230 mounted on, for example, the worktable 234 of machine tool 22 on the support 236.

Thus in operation, with a cylindrical workpiece 238 positioned on the worktable 234 and having an internal diameter 240 of the same dimension as the electrode 212 without the projections 214, the base 196 of the tool 194 carrying the electrode 212 is moved toward the workpiece 238 so that as the electrode 212 engages the workpiece 238 with the projections 214, whereby electrical discharge machining may be accomplished. The shaft 220 engaged with the cam surface 228 will rotate the block 210 and electrode 212 to provide grooves 242 in the workpiece 238 having any desired axial contour placed on the cam surface 228.

Figure 12:
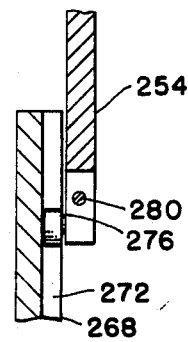
FIGURE 12 is an enlarged partial section view of a portion of the tool illustrated in FIGURE 11 taken substantially on the line 12—12 in FIGURE 11.
Figure 13:
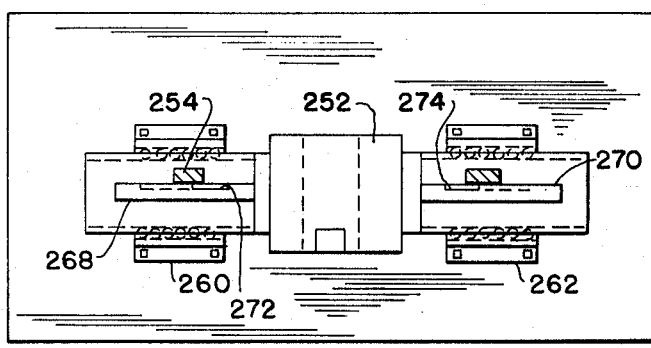
FIGURE 13 is a section view of the tool illustrated in FIGURE 11 taken substantially on the line 13—13 in FIGURE 11.

The quick-change tool 244 illustrated in FIGURES 11–13 is provided to permit machining of both sides of a workpiece 246 simultaneously by electrodes 248 and 250 on downward movement of a ram connected to the tool 244 by means of the dovetail portion 252 connected to the yoke 254. Workpiece 246 which may have a varied contour along the length thereof, as indicated by the dotted line 256, may be supported from the worktable 258 by convenient means (not shown), as, for example, from one end thereof. The tracks 260 and 262 are supported on the worktable 258 at opposite sides of the workpiece 246 and support the slides 264 and 266 to which the electrodes 248 and 250, respectively, are secured for reciprocal movement toward and away from the workpiece 246. Guide blocks 268 and 270 are secured to the slides 264 and 266, respectively, and have inclined grooves 272 and 274, respectively, therein engaged with the rollers 276 and 278 carried by the yoke 254 and urged into contact with the sides of the grooves by means of adjusting screw and slot structures 280 and 282, respectively.

Thus in operation, with the workpiece 246 secured to the worktable 258, the tracks 260 and 262 are secured to the worktable on opposite sides of the workpiece with the slides in a withdrawn position, that is separated with respect to each other, whereby the electrodes 248 and 250 are out of engagement with the workpiece 246. The yoke 254 is secured to the ram 42 of machine tool 22 with the rollers 276 and 278 in the slots 272 and 274 at the top thereof. Screws 280 and 282 are adjusted to provide proper contact with the sides of the grooves 272 and 274 and the yoke 254 is moved downward by means of the ram. Downward movement of the yoke forces the slides 264 and 266 carrying the cam blocks 268 and 270 toward each other due to the inclined nature of the slots 272 and 274, whereby the electrodes 248 and 256 engage the workpiece 246 on both sides thereof to simultaneously machine both sides of the workpiece.

Figure 15:
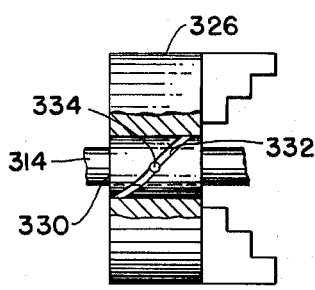
FIGURE 15 is an enlarged partly broken away view of a portion of the machine tool illustrated in FIGURE 14.
Figure 14:
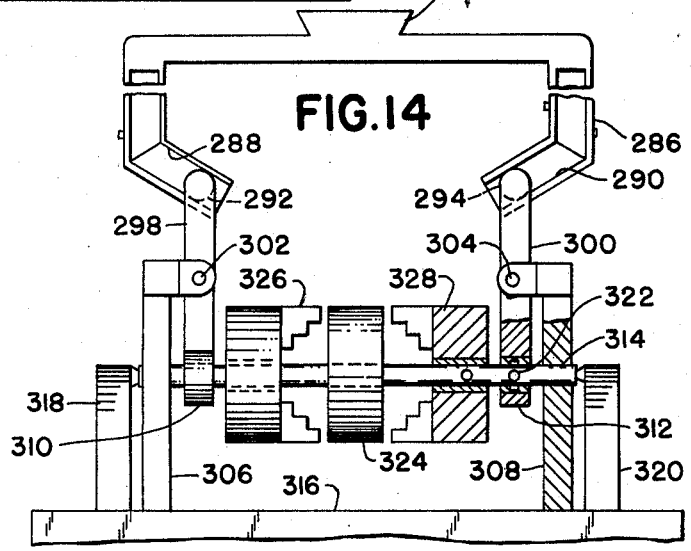
FIGURE 14 is a partly broken away elevation view of a quick-change tool for use in conjunction with the machine tool illustrated in FIGURES 1–4 for advancing electrodes towards both sides of a workpiece simultaneously while rotating the electrodes.
Figure 22:
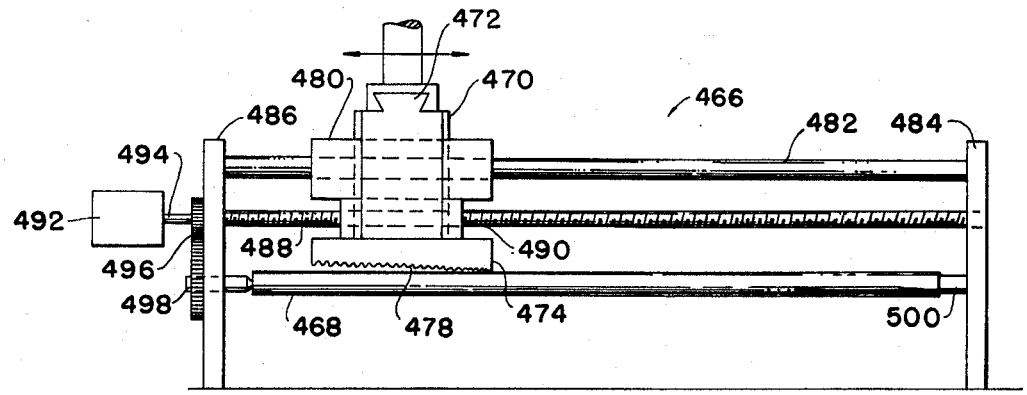
FIGURE 22 is a perspective view of a quick-change tool for use in conjunction with the machine tool illustrated in FIGURES 1–4 for cutting threads on a cylindrical member.
Figure 20:
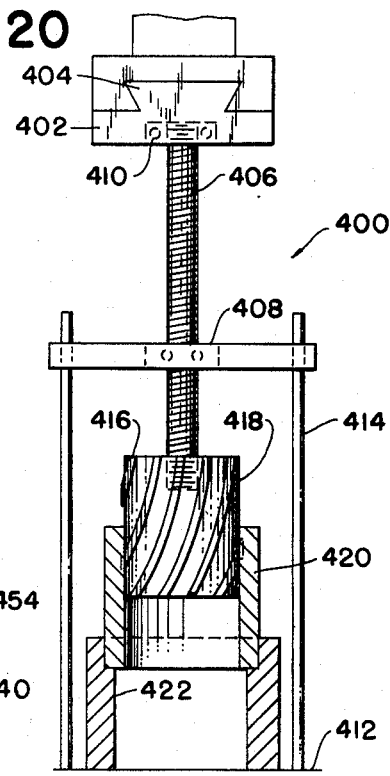
FIGURE 20 is an elevation view of a quick-change tool for use in conjunction with the machine tool illustrated in FIGURES 1–4 for use in conjunction with the machine tool illustrated in FIGURES 1–4 for cutting splines or the like in cylindrical members.

The quick-change tool 284 illustrated in FIGURES 14 and 15 includes the yoke 286 having the inclined grooves 288 and 290 in the opposite sides thereof inclined at opposite angles and receiving the rollers 292 and 294. Yoke 286 includes the dovetail portion 296 by which the yoke is secured to the ram 42 of machine tool 22 or the like for vertical movement. Rollers 292 and 294 are rotatably secured to one end of levers 298 and 300 which are pivotally mounted centrally by pivot means 302 and 304 to the supporting structures 306 and 308 therefor.

The opposite ends 310 and 312 of the levers 298 and 300 are movable along the shaft 314 which is supported on a worktable 316 by means of the supports 318 and 320. Workpiece 324 is fixedly secured to the shaft 314 centrally thereof, while electrodes 326 and 328 are mounted for both axial and rotational movement toward the workpiece 324 on shaft 314 by sleeves 330 connected to the electrodes having slots 332 therein and pins 334 connected to the shafts 314, as shown best in FIGURE 15.

Thus, in operation, with the workpiece 324 rigidly secured to shaft 314 which is held in a fixed position on the supports 318 and 320, the yoke 286 is moved downwardly by means of a ram connected to the dovetail portion 296 thereof. The levers 298 and 300 are thus pivoted counterclockwise and clockwise, respectively, to urge the electrodes 326 and 328 and the sleeves 330 connected thereto toward the workpiece 324. Due to the interaction of the pins 334 and slots 332 the electrodes 326 and 328 are rotated about the axis of the shaft 314 in a controlled manner as they are advanced toward the workpiece 324 to machine the workpiece 324 on both sides simultaneously for providing cutters and the like.

The quick-change tool 335 illustrated in FIGURES 16 and 17 again includes a base 336 having a dovetail portion 338 for mounting the base on the ram of a machine tool 22. A large diameter rack or gear 340 is secured to the base 336 at end 342 thereof, while the motor 344 is secured to the other end 346 of the base by means of the brackets 348. The disc 350 having the radially extending slot 352 therein is secured to the shaft 354 of the motor 344 for rotation thereby.

A pinion 356 is rotatably secured to one end of a link 358, the other end of which is pivotally secured to the base 336. Pinion 356 is in mesh with the rack 340. An electrode 360 is rotatably secured to the link 358 and the similar link 362 at the opposite side of the base 336, as shown best in FIGURE 17. The link 358 is pivotally connected by pivot means 364 to link 366 which is pivotally connected by adjustable pivot means 368 to the disc 350. The pivot means 368 may be variably positioned in different fixed positions along the slot 352.

Thus in operation, with the base 346 connected to the ram 42 of a machine tool 22, the base 336 is lowered toward a workpiece 370 in which it is desired to machine a wide arcuate surface 372 which may have a plurality of fins or grooves therein. The motor 344 is energized to rotate the disc 350. The link 366 is thus reciprocated a distance determined by the setting of the pivot means 368 in the slot 352 to reciprocate the pinion 356 in opposite directions on the rack 340. The electrode 360 which may have a desired longitudinal configuration to provide a desired surface 372 is thus caused to reciprocate over the surface 372 while it is rotated to machine the surface 372.

The quick-change tool 374 illustrated in FIGURES 18 and 17 again includes a base 336 having a dovetail portion 378 by which the tool 374 may be secured to the ram 42 of the machine tool 22. A pair of support members 380 and 382 are provided at opposite edges of the base 376 and are provided with arcuate slots 384 therein. An electrode holding chuck 386 is pivotally secured at end 388 between the members 380 and 382 by the pivot pins 390. The electrode mounting chuck 386 may be secured in any angular position through one hundred eighty degrees about the pivot pins 390 on locking of the bolts 392 in the slots 384.

The chuck 386 includes the rotatable section 394 in which the electrodes 396 are held in angularly spaced apart relation extending radially outwardly therefrom. On loosening of the nut 398 the section 394 may be indexed relative to the rest of the chuck 386 to variously position the electrodes 396, after which the nut 398 may be again tightened to secure the electrodes in any desired angular position about the chuck 386.

Thus in operation, with the base 376 secured to the ram 42 of a machine tool 22, the electrodes 396 may be positioned in substantially any desired angular relation to a workpiece and the various electrodes indexed into the desired position.

The quick-change tool 400 illustrated in FIGURE 20 again includes a base 402 having a dovetail portion 404 for securing the base 402 to the ram of a machine tool. The screw 406 of a ball nut and screw combination including the nut 408 is rotatably secured to the base 402 by the bearing 410. The nut 408 is secured in a fixed position on, for example, a worktable 412 of machine tool 22 by the supporting structure 414. A splined electrode 416 having external splines 418 thereon which it is desired to produce internally in the workpiece 420 is rigidly secured to the bottom of the screw 406 for rotation therewith. The workpiece 420, which is a hollow cylindrical member, is supported on the worktable 412 by convenient supporting structure 422.

Thus in operation, with the screw 406 extending through the nut 408, on downward movement of the base 402 with the machine tool ram 42, the screw 406 is caused to rotate and will feed the electrode 416 downward and into the workpiece 420, while electrode 416 is rotated. Internal splines will thus be produced on the cylindrical workpiece 420. It will be understood that external splines may similarly be produced on a cylindrical member providing that the electrode is an internally splined electrode designed to fit thereover.

Figure 21:
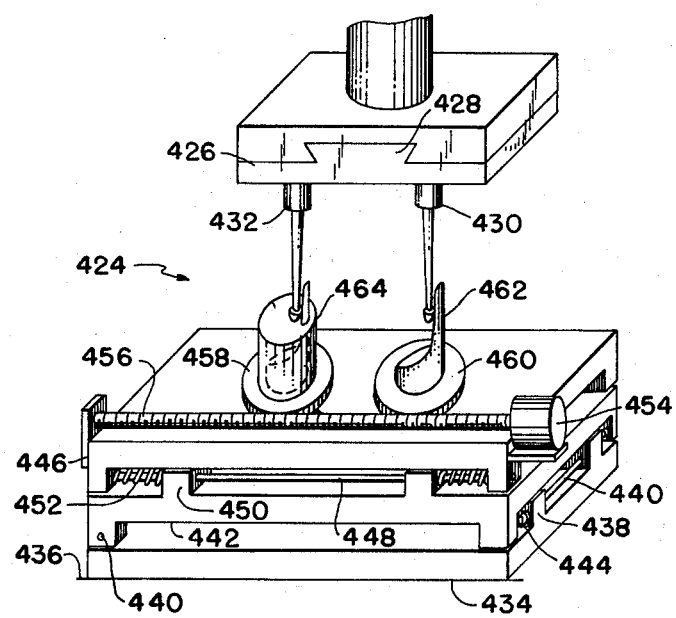
FIGURE 21 is a partially broken away elevation view of a quick-change tool for copying a master pattern.

The quick-change tool 424 of FIGURE 21 includes the base 426 having the dovetail portion 428 from which a stylus 430 and an electrode 432 are suspended for servo feed downward in accordance with the usual feed of an electrical discharge machining servo feed in conjunction with ram 42. The electrode 432 and stylus 430 may be stationary or rotated as desired.

Tool 424 further includes a base 434 which may be secured in place on the worktable 436 of the machine tool 22 and includes a pair of longitudinally extending blocks 438 through which rods 440 carried by the slide 442 extend. The slide 442 is biased to a central position by resilient means 444 with respect to the base 434. A similar slide 446 carrying rods 448 extending through transversely extending blocks 450 on slide 442 is carried on the slide 442. The slide 446 is biased into a central position on the slide 442 by the springs 452. It will thus be seen that the slides 442 and 446 may be moved in directions at right angles to each other relative to the base 434 and are biased into a predetermined central position on the base 434.

A motor 454 is supported on the slide 446 for rotating the worm 456 in engagement with the worm wheels 458 and 460. A master pattern 462 is positioned on the worm wheel 460 while a conducting workpiece 464 is secured to the wheel 458 for rotation therewith.

Thus in operation, the stylus and electrode are moved down by the usual servo mechanism into contact with the master pattern 462 and the workpiece 464. The motor 454 is rotated whereby the stylus 430 causes the slides 446 and 442 to follow a path determined by the shape of the master pattern 462, while the electrode 432 cuts a duplicate of the master pattern 462 from the workpiece 464.

The quick-change tool 466 for threading cylindrical members, such as rods, pipes and the like 468, includes a slide 470 which may be connected to the ram 42 of machine tool 22 by the dovetail portion 472 for servo movement of an electrode 474 into and out of engagement with the cylindrical member 468. The electrode 474 includes the teeth 478 thereon adapted to cut threads in the cylindrical member 468 with the electrode 474 in proper position radially of the member 468 on rotation of the member.

The slide 470 is carried by the guide 480 which is slidably mounted on the rods 482 supported by the upright supports 484 and 486. The guide 480 is moved along the rod 468 as the rod is rotated and in a predetermined relation with respect thereto by the screw 488 and nut 490 on rotation of the screw 488. The screw 488 is rotated by motor 492 through motor shaft 494 and the gear chain 496 connected between the shaft 494 and the center 498 which in conjunction with the center 500 maintains the member 468 in position for rotation.

Thus in operation, the rod 468 is secured between the rotatable centers 498 and 500 with the proper gear chain positioned between the center 498 and motor 492 to produce threads on the member 468 having a desired pitch. The electrode 474 is then moved into engagement with the rod 468 at the position therealong that it is desired to cut threads thereon and the motor 492 is rotated to rotate the rod 468 and the screw 488 whereby the electrode 474 is moved longitudinally of the rod 468 while the rod 468 is rotated to produce the desired threads thereon. The motor 492 may also be a servo motor of the usual kind.

Thus, it will be seen that there is provided in accordance with the invention a machine tool for use in electrical discharge machining apparatus including a quick-change chuck for interchangeably mounting thereon a plurality of separate tools for performing a plurality of different machining operations and a plurality of interchangeable electrical discharge machining tools for performing specific operations. The machine tool, quick-change chuck and quick-change tools for use therewith will be seen to be particularly simple, economical and efficient.

While one embodiment of the present invention has been disclosed in detail, it will be understood that other embodiments and modifications hereof are contemplated. For example, the quick-change tools and chuck may be used with electro-chemical machining apparatus as well as electrical discharge machining apparatus and other similar equipment. It is the intention to include all embodiments and modifications as are defined by the appended claims within the scope of the invention.

What I claim as my invention is:

1. A tool for the electroerosion machining of metals or the like, comprising means for supporting a pair of electrodes for rotation including a base member having a dovetail portion and an electrode supporting member having a complementary dovetail portion slidably engaged with the dovetail portion of the base member, means operably associated with the support means and electrodes for synchronized rotation of the electrodes in a predetermined relation to each other including a driven gear secured to each of the electrodes, motor means, a driven gear secured to the motor means, a pair of axially aligned gears secured together for simultaneous rotation and separate endless drive means, one of which passes around one of the pair of gears and one of the driven gears and the other of which passes over the other driven gear, the other of the pair of gears and the drive gear and means operably associated with the base member and electrode supporting member for moving one of the electrodes relative to the other.

2. Structure as set forth in claim 1 wherein the means for relatively moving the electrodes includes a nut and screw, one of which is secured to the base member and the other of which is secured to the electrode supporting member.

3. Structure as set forth in claim 1 and further including a spring biased separate idler gear engaged with said other endless drive means for maintaining a predetermined tension thereon on relative movement of the electrodes.

4. Structure as set forth in claim 1 and further including means for rapidly and accurately securing the tool to electrical machining apparatus comprising a base member having a dovetail portion with a locating slot therein.

References Cited

UNITED STATES PATENTS

| 2,885,529 | 5/1959  | Nelson.             |        |
|-----------|---------|---------------------|--------|
| 2,903,557 | 9/1959  | Matulaitis.         |        |
| 3,067,317 | 12/1962 | Buro.               |        |
| 648,571   | 5/1900  | Ortengren           | 51—80  |
| 2,236,713 | 4/1941  | Metzger             | 51—80  |
| 2,539,439 | 1/1951  | Kumler.             |        |
| 2,648,174 | 8/1953  | Bikles              | 51—80  |
| 2,887,702 | 5/1959  | Freitag             | 51—80 X |
| 2,974,215 | 3/1961  | Inoue               | 219—68 |
| 3,115,454 | 12/1963 | Robischung et al.   |        |

FOREIGN PATENTS

| 1,220,607 | 1/1960  | France.       |
| 856,340   | 12/1960 | Great Britain.|

JOSEPH V. TRUHE, Primary Examiner

R. F. STAUBLY, Assistant Examiner

U.S. Cl. X.R.

51—80; 204—143